United States Patent Office 3,804,958
Patented Apr. 16, 1974

3,804,958
PROCESS FOR MAKING PORK SAUSAGE
Alonzo Theodore Adams, Raleigh, N.C., assignor to Goodmark, Inc., Raleigh, N.C.
No Drawing. Filed Jan. 27, 1972, Ser. No. 221,449
Int. Cl. A22c 11/00
U.S. Cl. 426—371    5 Claims

ABSTRACT OF THE DISCLOSURE

Process of making pork sausage having a relatively high degree of uniformity of fat content from hog carcasses having a wide range of fat contents, without the necessity for measuring the fat content of the carcasses, in which the hog carcasses are trimmed of all surface fat trimmings, which are separated and collected in one area, and the remaining lean meat trimmings are separated from the bones and collected in a second area, the surface fat trimmings and the lean meat trimmings then being combined in a predetermined ratio, which may be determined independently of the measured fat content of a particular carcass or a particular group of carcasses. Desirably, prior to stripping of fat from the carcasses, a multiplicity of carcasses are arranged to provide a relatively uniform distribution of light and heavy carcasses. The sausage made pursuant to this process may have regularly incorporated therein a substantial amount of hog jowl.

BACKGROUND OF THE INVENTION

This invention relates to a process for producing pork sausage from hog carcasses. The process is able to provide highly accurate and uniform control of the fat content of the sausage produced, when compared with the results of similar processes in accordance with prior art practices. The process is particularly useful in connection with the technique for producing pork sausage, used primarily in the southern states, wherein the pork sausage is manufactured from the entire hog carcass, i.e., the hams, shoulder picnics, loins, bacon bellies and bone trimmings, etc., rather than from selected portions of the carcass as is the practice in other parts of the country. However, this invention may also be applied to other processes for producing sausage from whole carcasses.

In producing sausage by any technique it is extremely important to be able to control uniformly the fat content of the sausage to the maximum extent possible and to confine fat content variations, from batch to batch, to the minimum range. This is the case for several reasons. An excessively fat sausage has low consumer acceptance, produces a low cooking yield of the finished sausage product, and may, if too high in fat content, violate applicable regulations of the United States Department of Agriculture. On the other hand, an excessively lean sausage product yields a tough and dry finished sausage, which has a low consumer acceptance, and is also uneconomical to produce because it wastes valuable lean meat.

It is also desirable to be able to incorporate hog jowls regularly in sausage, because of the relatively low economic value of hog jowls.

It is obviously of considerable importance to any manufacturer of sausage, in order to maintain the optimum profitability of a sausage producing and selling operation, and in order to assure optimum consumer acceptance of the product, to be able accurately and uniformly to control the fat content of the sausage being produced. It is also quite desirable to be able economically to produce sausage from a varying selection of hog carcasses having high, low and inbetween fat contents, while maintaining a high degree of uniformity of fat contents of the final sausage products.

STATE OF THE ART

In the typical process for making pork sausage from cold carcasses, the eviscerated hog carcasses are chilled to a temperature of about 35° F. to about 45° F. and subsequently cut into particular cuts, such as hams, shoulder picnics, etc. During this breaking operation, the bones are trimmed of residual lean meat and special cuts are trimmed of excess fat. Consequently, both chilled fat and chilled lean trimmings are available as ingredients for meat products, such as pork sausage. In a typical meat-producing facility, the fat content of the chilled fat and the fat content of the chilled lean trimmings are chemically determined, and a pork sausage meat formulation is calculated so that the use of certain proportions of particular trimmings will yield a pork sausage having the desired fat content. The pork sausage produced by this process has a reasonably uniformly controlled fat content, and thereby achieves maximum consumer acceptance and therefore maximum profitability.

In some sections of the United States, particularly in the southern states, pork sausage is often manufactured from the entire hog carcass, while the meat still retains considerable body heat, in the general range of about 75° F. to about 90° F., and without chilling the meat prior to comminuting and mixing. In a typical such prior art process, a warm, eviscerated, skinned hog carcass is deboned and the warm fat trimmings and warm lean meat trimmings, which are removed from the carcass without segregating lean meat trimmings from fat trimmings, are mixed with water and spices, comminuted, chilled with Dry Ice, and extruded into casings or formed into patties. This particular technique for producing pork sausage from hot carcasses is practiced to yield pork sausage having a unique, tender cooked texture; this product has considerable consumer appeal, especially in the southern section of the United States.

The prior art process for manufacturing pork sausage from warm, whole carcass meat trimmings, presents a formidable problem of control of fat content. This problem occurs because hog carcasses vary considerably in weight content from light carcasses to heavy carcasses, and because of the difficulty of analyzing warm meat of hot carcasses for fat content. This latter difficulty occurs because, when warm meat is ground or chopped, the fatty portion separates to the surface, making representative sampling for chemical analysis an impossible task. Also, accumulation of batches of warm meat, while samples are being tested for fat content, presents problems because of loss of heat from the meat as it awaits processing. This loss of heat could change the taste, texture and aroma characteristics of the products being produced, and could also cause undesirable bacteriological changes which could substantially reduce product shelf life and, if extreme bacteriological changes are allowed to occur, could present a health hazard.

The problem of maintaining uniformity of sausage fat content can be overcome, at some times, by maintaining a uniform input, to the abattoir, of light hogs and heavy hogs in a predetermined relationship, thereby to provide a specific fat to lean meat ratio for the sausage produced therefrom. However, although this technique can work very well on those days when the proper numbers of light and heavy hogs are available, the fat content of hogs being slaughtered frequently varies from day to day, and also from season to season, so that, on certain days, manufacturers must process either predominantly light hogs or heavy hogs. Accordingly, during those periods when the proper types of hogs (in terms of their fat content and lean meat content) were not available, producers of sausage by prior art processes could not regularly produce uniform pork sausage of reasonably controlled fat content, and ran the risk of low consumer acceptance of their products.

BRIEF SUMMARY OF THE INVENTION

This invention is directed to a process for making pork sausage from hog carcasses, and providing a high degree of uniformity of fat content of the sausage product, on a short term and on a long term basis, when compared with the prior art techniques available. In the practice of the process, the hogs are slaughtered and suitably eviscerated, decapitated, skinned and split, and, in the application of this invention to sausage produced from hot carcasses, while the carcasses are still warm, the layers of surface fat (the surface fat trimmings) are removed from the carcasses and placed in a receptacle. The invention can also be applied to cold carcasses, in which event the surface layers of fat (the surface fat trimmings) of the chilled carcass are removed. After the carcasses have the surface fat trimmings removed therefrom, the remaining, lean meat trimmings are removed from the carcasses and trimmed from the bones, and these lean meat trimmings are collected at a second location. Once the lean meat trimmings have been removed, the only remaining portion of the carcass is the bones, which are not used for making sausage. At this point in the process, the surface fat trimmings and the lean meat trimmings are usually present in chunks or slabs, weighing up to about ten or twenty pounds each.

As used herein, the "surface fat trimmings" constitute the surface layers of fat which are removed from a hog carcass. The "lean meat trimmings," as used herein, are the skeletal meat of a hog carcass, trimmed from the bones, after the "surface fat trimmings" have been removed.

Although the process of this invention can be applied to a single carcass, preferably the surface fat trimmings from at least four carcasses are accumulated in one location and the lean meat trimmings from the same four carcasses are accumulated at a second location. Each group of chunks of surface fat trimmings and lean meat trimmings is then mixed, and selected weights of lean meat trimmings and surface fat trimmings are then intermixed, in accordance with a predetermined weight ratio of lean meat trimmings to surface fat trimmings, which is preferably in the range from about 1 part of lean meat trimmings to 1 part of surface fat trimmings to about 2.2 parts of lean meat trimmings to 1 part of surface fat trimmings, and is most preferably a ratio of one, wherein equal weights of lean meat trimmings and of surface fat trimmings are intermixed. It is to be noted that the lean meat trimmings do have a fat content of their own, and that the surface fat trimmings may include some pieces of meat. At this point, the intermixed surface fat trimmings and lean meat trimmings may be seasoned and comminuted, and then accorded the conventional treatment necessary to complete the production of the sausage, e.g., stuffing into casings and refrigeration.

It is noteworthy that the lean meat trimmings and surface fat trimmings are maintained warm, i.e., at a temperature of at least 60° F., during this sausage-making process, when the process is used to make sausage from hot carcasses.

It is also desirable, although not essential to the practice of the invention, when combining carcasses, that the available carcasses be intermixed, so the light hog carcasses are uniformly intermixed with heavy hog carcasses, to the maximum extent possible, considering the characteristics of the available supply of the carcasses being processed at any given time. These characteristics may vary from day to day and from season to season, but at all times, the available carcasses will cover some range of weights.

In the practice of the process, it may be necessary to add hog jowl meat or additional hog fat trimmings to the lean meat trimmings and surface fat trimmings produced by slaughtering whole hogs for producing sausage, since hogs, on the average, contain lean meat trimmings and surface fat trimmings in the ratio of 1.3 parts of lean meat trimmings to 1 part of surface fat trimmings. Thus, if equal parts of lean meat trimmings and surface fat trimmings are desired to be used to make the final sausage product, there can be an inadequate amount of surface fat trimmings available to permit utilization of all the lean meat trimmings. Hog jowls or surface fat trimmings from other hogs may then be added to allow utilization of all available lean meat trimmings for the production of sausage, if desired.

OBJECTS OF THE INVENTION

It is therefore a primary object of the invention to provide a process for producing pork sausage from hot or cold hog carcasses, and particularly from hot carcasses wherein control of fat content is most difficult, and providing a high degree of uniformity of fat content of the sausage, without the necessity for making chemical analysis of fat content, and without having to accumulate a particular proportion of light and heavy hogs.

Another object of this invention is to provide a process for the production of pork sausage from hog carcasses which allows optimum utilization of available lean meat trimmings and surface fat trimmings.

A further object of this invention is to provide a process for producing pork sausage from hog carcasses, wherein seasonal and daily variations in hog size and weight will not substantially influence the fat content of the pork sausage produced therefrom.

Yet another object of this invention is to provide a process for making pork sausage which makes efficient use of hog jowls as a sausage ingredient.

DETAILED DESCRIPTION OF THE INVENTION

In the practice of the process of this invention, live hogs are initially slaughtered. Hogs may generally be divided into categories, according to their weight, as light hogs and as heavy hogs. These determinations are to some extent subjective, and need not be made precisely. Also, the characteristics of the surface fat trimmings and lean meat trimmings of the hog will depend upon, in addition to the weight of the hog, its overall size and its weight distribution. For purposes hereof, a light hog will be considered to be a hog having a live weight of up to about 500 pounds, and a heavy hog will be considered to be a hog having a live weight in excess of about 500 pounds.

In the practice of the instant process it is desirable, but not necessary, to mix uniformly light and heavy hogs in the hog pens prior to slaughter. This step will usually be subjective and approximate, and is intended to achieve a somewhat uniform distribution of hogs according to their content of fat and lean meat trimmings, and aids in controlling the uniformity of fat content of the sausage product.

When a hog is slaughtered, it has a body temperature of approximately 100° F. Upon slaughter, the blood is removed, the carcass is decapitated, eviscerated and skinned. The carcass is then split in half, and the carcass halves are hung by hooks on a suitable overhead trolley or track for easier handling purposes. At this point in the process, it is desirable, but not essential, in order to maximize the uniformity of fat content in the sausage product produced by the process of this invention, to uniformly mix, to the extent reasonably feasible under the circumstances, light carcasses and heavy carcasses. Accordingly, as the carcasses are being hung on the trolley, an attempt is made to have a relatively uniform distribution of light and heavy carcasses, considering whatever the sizes and numbers of the vailable carcasses may be. During certain periods of the year, more light carcasses than heavy may be available, and perhaps only one carcass in four, for example, may be heavy; on the other hand, at some other times, the situation may be reversed. Accordingly, a judgmental determination is made by the production employees of the general availability of light and heavy carcasses, and the carcasses are placed on the trolley in accordance with that determination, to further attempt to obtain a reasonably uniform distribution of light and heavy carcasses.

If the sausage produced is to be made from cold carcasses, the carcasses would be transported to a refrigeration unit for cooling, prior to further processing. If the sausage is to be made from hot carcasses the surface fat trimmings are then removed.

The surface fat trimmings are cut from the outer surface of the split carcasses, as the carcasses are suspended from the trolleys, and are typically cut in strips which may, for example, be six inches wide and twenty or thirty inches long, and which may weigh up to about twenty pounds. These strips of surface fat trimmings are then collected in a wheeled vessel beneath the carcass, or placed on a suitable conveyor belt, depending upon the nature of the available process equipment. Each carcass half is then removed from the trolley and placed on the boning table.

After the surface fat trimmings have been removed from the face of the split carcass and the carcass is on the boning table, the carcass is cut up with saws and the lean meat trimmings are then cut with boning knives into chunks weighing up to about twelve pounds, leaving only the bones, which, however, may contain some residual meat. This residual meat is then trimmed from the bones with knives and is placed with the remainder of the lean meat trimmings. These chunks and smaller pieces of lean meat trimmings are collected in an accumulation area on the boning table, or placed on a suitable conveyor belt, again depending upon the particular facilities available.

Once the lean meat trimmings have been removed from the bones, the bones and hooves are the only parts of the carcass which remain. These are not used to produce sausage.

Although the process of the instant invention may be practiced with surface fat trimmings and lean meat trimmings from a single carcass, the desired results of high uniformity of fat content from day to day and batch to batch are optimized, and considerably greater manufacturing efficiency is achieved, by processing, at one time, the fat and the lean meat from at least four, and preferably from about eight to ten, carcasses. It will be appreciated that the number of carcasses accumulated to produce a single batch of sausage will depend in large part upon the size of the equipment available in the manufacturing plant for handling meat, and also upon the size of the hogs which have been slaughtered at that time. Also, it is possible to utilize the process of this invention in a continuous process for producing sausage, in which instance it is, in any event, still to be preferred initially to admix the surface fat trimmings form at least four carcasses and the lean meat trimmings from at least four carcasses before proceeding further with the processing of the meat to make sausage.

At this point in the process, in a typical application of the process, a first vessel could contain approximately five hundred pounds of the surface fat trimmings stripped from the carcasses of about four hogs, and an accumulation area on the boning table could contain chunks of lean meat trimmings from the same four hogs weighing a total of approximately three hundred or four hundred pounds. It is to be appreciated that the weights involved may vary significantly between batches, depending upon the particular surface fat and lean meat trimmings contents of the individual hogs, and the total weights of the hogs.

The lean meat trimmings are intermixed, manually, at the accumulation area on the boning table. The surface fat trimmings which are dropped into a house truck, are also randomly and manually intermixed.

Part of the lean meat trimmings on the boning table and the surface fat trimmings are then placed in a weighing bucket in which lean meat trimmings and surface fat trimmings are weighed in batches totalling about 300 pounds. The weighed amounts, when they equal the total amount necessary to produce a given size batch, with a predetermined ratio of lean meat trimmings to surface fat trimmings, have water and a mixture of spices and adjuncts manually added to them in predetermined amounts. The conventional spices and adjuncts would be antioxidant, salt, granulated sugar, ground black, red and white pepper, monosodium glutamate and sage, by way of example, in such proportions and in such amounts that the total amount of seasoning and adjuncts may be 2.5 pounds per 100 pounds of lean meat trimmings and surface fat trimmings. The specific types and amounts of seasoning and water used are well known and form no part of this invention.

The chunks of lean meat trimmings and surface fat trimmings, with the seasoning and water added, are then placed in the hopper and ground by a suitable grinding machine, of a type which is well known in the art. Dry Ice may then be added to the ground meat, in a manner which is well known in the art, to thicken its consistency and make it easier to process further. The ground meat is then stuffed into sausage casings or made into patties and placed in a freeze and chilled to a temperature of about 23° F.

The chilled meat, stuffed into sausage casing or formed in patties, is then ready for final packaging and transportation for sale, in accordance with well known practices in the art.

It is important to note that, during the performance of the invention in making sausage from hot carcasses, the various steps of the process of preparing the carcass, cutting the lean meat trimmings and surface fat trimmings, intermixing the lean meat trimmings and surface fat trimmings, and seasonings, comminuting and stuffing the sausage or forming patties should be done during a relatively short period of time, and without any unusual ambient conditions which will unduly lower the temperature of the meat below about 60° F. This is important because undue cooling of the meat, prior to the chilling step, or prolonged residence of the meat prior to the chilling step, can result in bacteriological changes in the meat which will affect the overall appearance, taste and aroma of the meat, its shelf life, and its general salability and consumer acceptability.

Particular manufacturers will desire to regulate the total fat content of their pork sausage products to satisfy their own determinations of the optimum salability of their product, consistent with reasonable product costs. Also, one manufacturer may desire to produce two or more sausage products differing in their fat contents, as well as other ways, such as amount and types of seasoning. In the most preferred form of the invention, the manufactured product will contain equal parts of lean meat trimmings and surface fat trimmings. However, it is within the scope of the invention for the manufactured product to contain lean meat trimmings and surface fat trimmings in ratios from about 1 to about 2.2 by weight of lean meat trimmings to surface fat trimmings. The specific ratio of lean meat trimmings to surface fat trimmings used for any particular product, and the consequent fat content of the product, is a matter of choice, and will usually be determined initially on a trial-and-error basis.

A typical hog will have approximately 1.3 times as much lean meat trimmings as surface fat trimmings (although this ratio can vary considerably in individual instances). Accordingly, if product having approximately equal amounts of lean meat and fat, i.e., having a fat content of about 50%, is desired, additional fat may often have to be added, in order to be able to utilize all of the lean meat trimmings. This additional fat may be obtained from one of two sources. It can be obtained from hogs which have been slaughtered for other purposes than using the entire carcasses for manufacturing sausage, such as hogs which have been slaughtered for processing or selling other kinds of meat products or for particular cuts.

Also, when the head is removed from the hog, early in the manufacturing process, the jowls of the hog are removed from the head and are skinned. The jowls are quite edible, having a substantial meat content, but having a very high content of fat. The jowls have a relatively low economic value, and it is desirable to use all jowls in the manufacturing plant, if possible, for manufacturing economy. Therefore, the formula for admixing lean meat trimmings and surface fat trimmings can be adjusted, if desired or as needed, to take into account the lean meat and fat content of hog jowls, and the jowls may often be used in the practice of this invention to make up for the lack of adequate surface fat trimmings. As a general rule, the average amount of fat in pork jowls is about 61% by weight. The remainder of the jowls is lean meat.

In any formulation of lean meat trimmings and surface fat trimmings, it may be desired to add the jowls as a product ingredient. This can conveniently be done by estimating the lean meat and fat contents of the formulation in accordance with the relative amounts thereof present in light and heavy hogs, as detailed in Table II; jowls may then be substituted in the formulation for part of the lean meat trimmings and part of the surface fat trimmings by considering the jowls to have a fat content of 61% by weight and a lean meat content of 39% by weight.

It may be that, on certain days or seasons, the carcasses are exceptionally high in fat content, so that more surface fat trimmings are produced than are necessary to combine with the lean meat trimmings produced to produce sausage. These excess surface fat trimmings may be chilled and used in other formulated meat products, such as to manufacture frankfurters or bologna.

It is noteworthy that no one combination of lean trimmings, surface fat trimmings and, in those cases where required or desired, hog jowls, can be established, since these will obviously depend on the desired fat level of the end product being produced, which will be a matter of choice. However, the following Table I presents a series of different combinations of lean meat trimmings, surface fat trimmings and, in some instances, hog jowls, and the percent of fat in the finished sausage product produced therefrom. In calculating the fat contribution of the jowls, the jowls are considered as being 61% fat by weight.

TABLE I

| Lean meat trimmings (lbs.) | Surface fat trimmings (lbs.) | Hog jowls (lbs.) | Sausage fat content percent by weight [1] |
| --- | --- | --- | --- |
| 150 | 150 | 0 | 50.85 |
| 150 | 140 | 10 | 50.30 |
| 150 | 130 | 20 | 49.76 |
| 150 | 120 | 30 | 49.21 |
| 150 | 110 | 40 | 49.66 |
| 150 | 100 | 50 | 48.12 |
| 160 | 140 | 0 | 49.08 |
| 160 | 130 | 10 | 48.53 |
| 160 | 120 | 20 | 47.99 |
| 160 | 110 | 30 | 47.28 |
| 160 | 100 | 40 | 46.89 |
| 160 | 90 | 50 | 46.35 |

[1] Actual fat percentages in sausage with water and seasoning added can be approximated by multiplying fat percentages by 0.95.

It is important to note that the practice of the process of this invention provides sausage having considerable uniformity of fat content, when compared with sausage produced from hot carcasses in accordance with prior processes in those circumstances where accurate chemical assessment of fat content of lean meat trimmings and surface fat trimmings is not practicable, and aids in providing uniform fat content in sausage produced from cold carcasses. For example, the following Table II illustrates average weights and percentages of lean meat trimmings and surface fat trimmings for three light hogs and three heavy hogs.

TABLE II

| Carcass grade | Designation | Meat trimmings (lbs.) | Fat content (percent) |
| --- | --- | --- | --- |
| Light | Lean meat trimmings | 133 | 20.2 |
|  | Surface fat trimmings | 65 | 70.5 |
| Heavy | Lean meat trimmings | 133 | 28.4 |
|  | Surface fat trimmings | 144 | 84.3 |

Note, from Table II, that lean meat trimmings do contain a significant amount of fat (e.g., 20.2% for the light carcasses) and that surface fat trimmings do contain a significant amount of lean meat (e.g., 29.5% for the light carcasses). Approximate determinations of the fat content of sausage products can be made by utilizing the fat data of Table II. If sausage were to be made from hog carcasses as indicated in Table II, the light carcasses would yield sausage having a fat content of 36.7% and the heavy carcasses would yield a sausage having a fat content of 57.5% (excluding the effect of the presence of water and seasoning in the sausage product). Accordingly, the range of fat content between sausage made from one size of carcass and the other size may be up to 20.8% for the example hogs of Table II, and may, in some instances, be up to 25%. Therefore, if the mix of light carcasses and heavy carcasses is not uniform or is not readily controllable—and such control was often not possible prior to the instant invention—considerable variations of up to 20% or 25% in fat content of the sausage end product will normally inevitably result.

Table III shows the low fat content and high fat content, on a monthly basis, of sausages made in commercial quantities by the conventional process of the prior art and sausage made in commercial quantities by the process of this invention. The range of fat variations by the prior art process is generally at least twice the range of the variations using the present process. Generally, it is to be expected that the proper practice of this invention will produce sausage having a variation in fat content of approximately 8 percent, in comparison with up to 21% to 25% variation in fat content to be expected in pork sausage manufactured from hot carcasses by the prior art process.

TABLE III
Prior Art Process

| Month | Lo Fat content (percent) | Hi Fat content (percent) | Range (fat content) |
| --- | --- | --- | --- |
| February | 35 | 57 | 22 |
| March | 36 | 54 | 18 |
| April | 38 | 55 | 17 |
| May | 42 | 59 | 17 |
| June | 35 | 52 | 17 |
| July | 34 | 53 | 19 |
| August | 35 | 56 | 21 |
| September | 35 | 51 | 16 |
| October | 34 | 53 | 19 |
| November | 35 | 53 | 18 |
| December | 35 | 52 | 17 |

Instant Invention Process

| February | 42 | 51 | 9 |
| March | 40 | 50 | 10 |
| April | 41 | 50 | 9 |
| May | 41 | 50 | 9 |
| June | 41 | 51 | 10 |

In one instance, pork sausage from hot carcasses was commercially manufactured during a one month period, in accordance with the process of this invention, using a meat mixture composed of 150 pounds of lean meat trimmings, 110 pounds of surface fat trimmings and 35 pounds of pork jowls, plus seasoning and water in conventional quantities, to provide a total batch size of 316 pounds. During this one month period, 100 separate batches of sausage, of about 316 pounds per batch, were sampled and analyzed for fat content. A statistical analysis of fat content values of the sausages produced during the month yielded an average fat content for the sausage product of 46.7%, with a probability that at least 95% of the sausage produced had a fat content in the range of 43.2% to 50.2%, a 7% variation. This 7% variation is to be compared with the 21% variation of fat contents which could be expected when sausage is manufactured from hot carcasses in accordance with the prior art processes.

The instant process also provides the added benefit of allowing the use of pork jowls, a commodity having a relatively low cost, to maintain the quality of the sausage, and maintain the fat content, during those periods when additional fat is necessary, or when the use of hog jowls as a meat source is economically desirable, without compromising the quality of the sausage being produced.

The process of the instant invention can be used for a batch-type process for making sausage, as previously described, or for a continuous process. In adapting this invention for a continuous process, the hogs would be slaughtered and trimmed in the manner described for a batch-type process. The lean meat trimmings and surface fat trimmings would separately be transported, as on conveyors, to mixers where the contents of each mixer would be comminuted and mixed, and extruded from each mixer onto weighing conveyors in predetermined ratios. The two weighing conveyors would discharge into a grinder hopper where the meat would be further ground and discharged into a mixer screw conveyor. Seasoning and water would be added, using suitable metering equipment, into the screw conveyor, and the mixture would then be chilled with Dry Ice or liquid nitrogen. The chilled sausage would then be transported to a vacuum stuffer for stuffing into suitable casings. The sausages could then be packaged automatically with suitable commercially available equipment. If an automatic process including equipment for introducing pork jowls is desired, a separate mixer, grinder and weighing conveyor for the pork jowls would discharge its contents, in predetermined amounts, into the hopper grinder.

It is to be noted that the process of this invention could be applied to the manufacture of other sausage products, such as smoked sausage. Smoked sausage would be produced with a lower fat content than is usual in unsmoked sausage, but could otherwise be made from a sausage mixture produced in accordance with the process of the invention.

It is to be noted that, although the preferred mode of practicing this invention has been described, numerous changes in the described process can be made without departing from the spirit and scope of this invention. It is particularly to be noted that a wide variety of meat-to-fat ratio products can be produced, with wide variations in the precise times and other ancillary processing conditions, within the purview of this invention.

What is claimed is:
1. A process for making sausage from hog carcasses comprising the following steps:
    (a) Stripping the surface layer of fat from at least one hog carcass;
    (b) Removing the remaining lean meat in the carcass from the bones;
    (c) Mixing the respective surface fat trimings and lean meat trimmings which have been separated from the carcass in a predetermined weight ratio of lean meat trimmings to surface fat trimmings in the range from about 1 to about 2.2; and
    (d) Completing the production of the sausage.
2. A process as set forth in claim 1, including the preliminary step, prior to trimming the fat from the carcass, of taking a multiplicity of carcasses and arranging them prior to the stripping step in such order that light carcasses and heavy carcasses, among those carcasses available to be slaughtered and being slaughtered at that time, are reasonably uniformly intermixed.
3. A process as set forth in claim 1, including the separation and accumulation of hog jowls, and including the step of admixing hog jowls with the lean meat trimmings and the surface fat trimmings in a predetermined relation to the amount of lean meat trimmings and surface fat trimings combined.
4. A process as set forth in claim 1, in which the weight ratio of lean meat trimmings to surface fat trimmings is about 1.
5. Process as set forth in claim 1, wherein the steps are all carried out without lowering the temperature of the surface fat trimmings below about 60° F.

References Cited
UNITED STATES PATENTS

| | | | |
|---|---|---|---|
| 3,124,462 | 3/1964 | Vogel et al. | 99—109 |
| 3,687,689 | 8/1972 | Podebradsky | 99—109 |

HYMAN LORD, Primary Examiner